3,370,102
ISOTHERMAL-LIQUID-LIQUID PERMEATION SEPARATION SYSTEMS

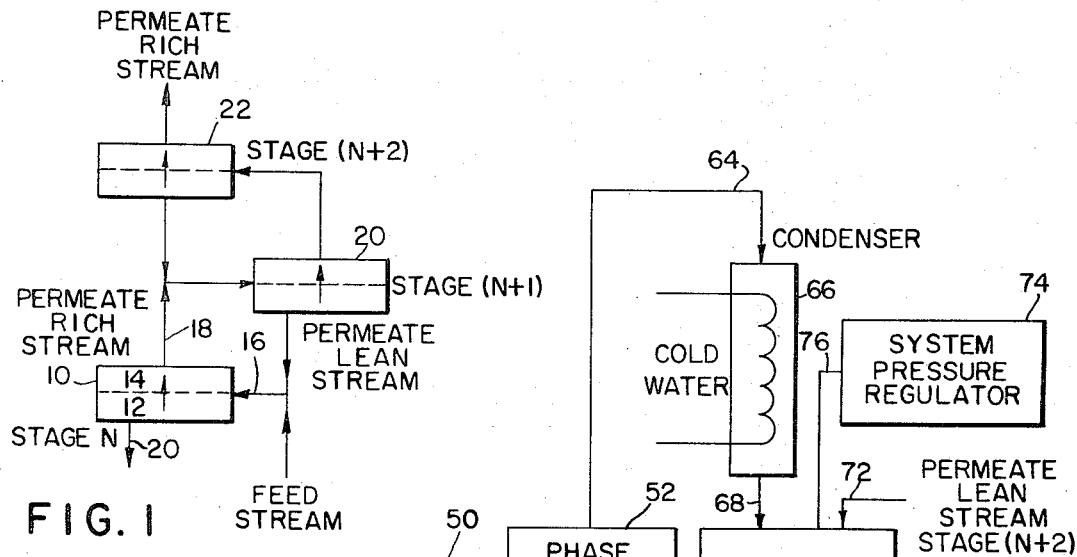
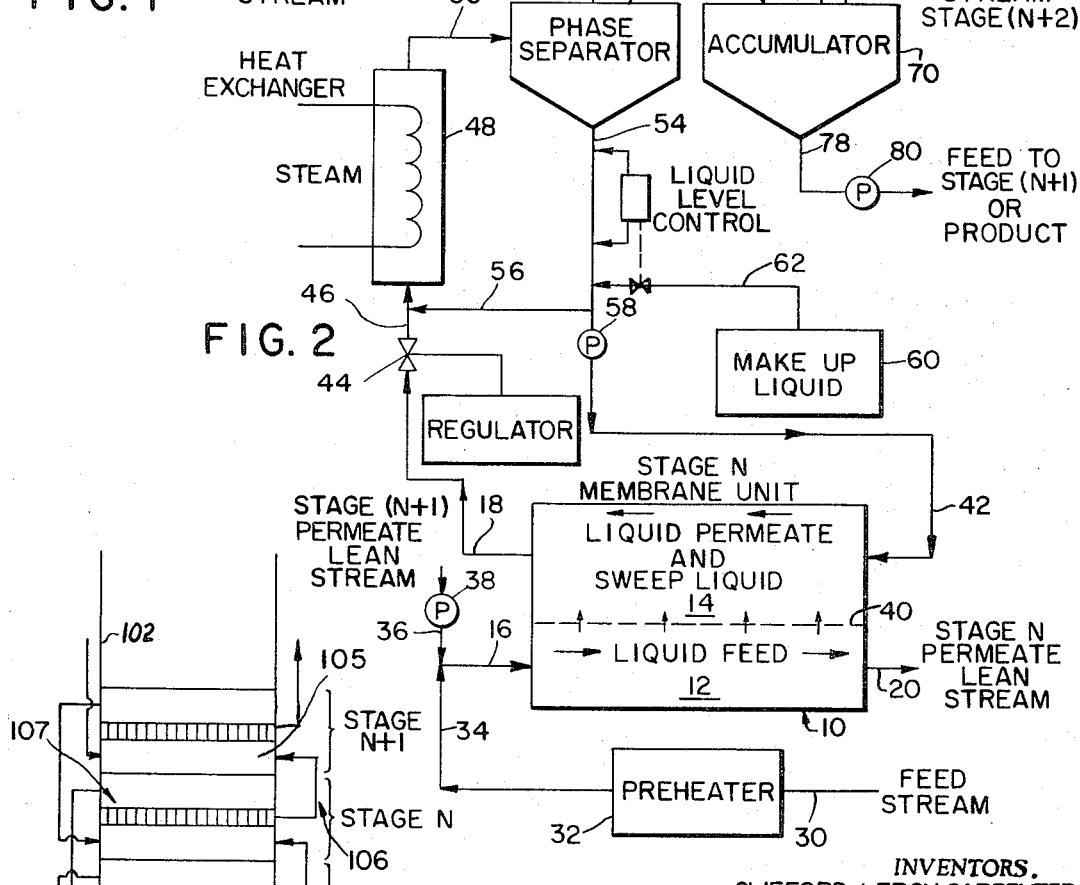
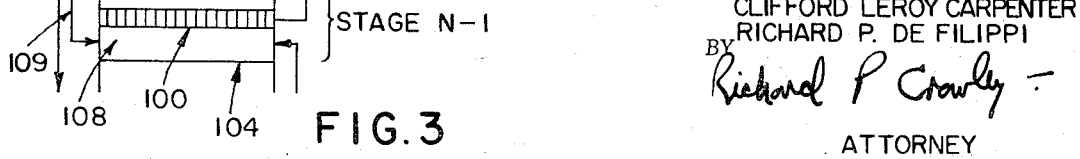

Clifford Leroy Carpenter and Richard P. de Filippi, Wellesley, Mass., assignors, by mesne assignments, to Abcor, Inc., Cambridge, Mass., a corporation of Massachusetts
Continuation of application Ser. No. 524,778, Feb. 3, 1966. This application May 5, 1967, Ser. No. 636,546
15 Claims. (Cl. 260—674)

This application is a continuation of Ser. No. 524,778 filed Feb. 3, 1966, now abandoned.

Our invention relates to an isothermal process for the separation of liquids employing membrane permeation techniques. In particular, our invention relates to isothermal-liquid-liquid permeation systems wherein liquid mixtures such as hydrocarbons are separated by permeation through a nonporous membrane with the permeate fraction dissolved in a liquid sweep stream and the permeate fraction recovered from the sweep stream by addition of only the latent heat of vaporization of the permeate to the liquid stream.

The separation of a wide variety of liquid mixtures has been accomplished in the past by various membrane permeation techniques. For example, hydrocarbon mixtures may be separated into various fractions such as aliphatic, aromatic, unsaturated, saturated, straight chain, branch chain and the like, or separated by molecular configuration or boiling points by permeating a portion of the liquid hydrocarbon mixture through a nonporous membrane. Separation of mixtures is accomplished by taking advantage of the difference in the rate at which various fractions or components of the mixtures permeate a thin, solid, nonporous membrane. In typical processes devised to carry out such a separation, a feed liquid mixture is placed in contact in a feed zone with the membrane wherein one fraction of the liquid mixture dissolves into the upstream face of the membrane, diffuses through the membrane driven by a concentration gradient and then evaporates from the downstream face into a permeate zone. The evaporation may be effected by maintaining a low total pressure downstream from the membrane in the permeate zone. It is advantageous to remove the permeate fraction from the permeate zone rapidly to maintain a good concentration gradient as a driving force. Thus, in some cases a sweep gas is used in the permeate zone at a flow rate sufficiently high to maintain a low partial pressure of the diffusing component, i.e. the permeate fraction. The fraction is then recovered by condensing the effluent stream from the permeate zone, and distilling off the sweep gas.

Past liquid-vapor permeation separation techniques have suffered from at least two major disadvantages resulting from the evaporation of the permeate in the permeate zone as it passes from the downstream membrane surface. First, the latent heat of vaporization of the permeate fraction must be supplied at or near the membrane surface. This requires heating the feed mixture to the membrane unit, thereby supplying the latent heat from the sensible heat of the liquid feed stream. Other means include introducing a heat source such as by internally heating the membrane unit by steam or by using a heated sweep gas in the permeate zone. In each case, considerable difficulty is and can be experienced in eliminating temperature gradients within the membrane unit, together with the consequent possibility of overheating the thin, nonporous usually polymeric membrane structure. In many cases it is desirable to operate a membrane system at a temperature approaching or close to the membrane melting point or the critical solution temperature of the membrane, i.e. the melting point of the membrane in contact with any particular liquid material. Therefore, providing the latent heat of vaporization in the permeate zone or to the membrane surface may result in damage or destruction of the membrane, a short use life of the membrane material or process operation at considerably less than optimum temperature conditions.

Another difficulty associated with the "pervaporative" systems which have tended to restrict commercial development of membrane techniques is the usually high equipment, power requirements and operating costs necessary to maintain a suitable vacuum with the total pressure reduced, or for the compensation of frictional pressure losses in circulating large quantities of a sweep gas at a high flow rate. These and other difficulties are particularly evident for a liquid feed mixture of low vapor pressure at the membrane unit operating temperatures. The equipment and power cost for vapor or gas compression in such systems can be expensive and may often be economically prohibitive.

It is an object of our invention to provide a system and means for the separation of liquid mixtures by an isothermal-liquid-liquid membrane permeation operation.

Another object of our invention is to provide a practical means of and method for separating liquid mixtures such as hydrocarbon mixtures through the use of a re-cycled liquid sweep stream in an essentially isothermal membrane permeation system.

A further object of our invention is to provide a method for the separation or concentration of various isomers and fractions from liquid mixtures such as the separation of para and meta xylene fractions, and the separation of butene-1 and isobutene fractions from feed streams containing these mixtures.

Other objects and advantages of our invention will be apparent to those persons skilled in the art from the following more detailed description of our invention taken in conjunction with the accompanying drawing wherein:

FIG. 1 is a diagrammatic representation of a multi-stage membrane permeation system;

FIG. 2 is a schematic illustration of a single-stage membrane permeation system for the isothermal separation of a liquid hydrocarbon mixture employing a liquid sweep stream; and FIG. 3 is a schematic illustration of a multi-staged column-type permeation membrane unit employing hollow fiber-containing membrane plates alternating with solid barriers for each stage.

Briefly, our invention avoids the difficulties associated with the "pervaporative" and other prior membrane separation systems by the operation of a liquid-liquid membrane system under essentially isothermal conditions and in employing a liquid sweep or solvent stream in the permeate recovery system. The operation of our process at a particular selected temperature, in combination with the use of a liquid solvent stream, eliminates or substantially reduces the problem of transferring heat to the membrane in the membrane unit, and avoids the high equipment and operating costs associated with compression of gas streams. The use of a liquid sweep stream also is most advantageous in that in liquid flow only very low pumping energy requirements are required to make up for frictional losses, in comparison to that needed in sweep gas flow. Further, to avoid relatively large inputs and outputs of sensible heat, for example through the liquid solvent stream between the membrane unit and other components of the permeate recovery system, the entire system and process is operated in a substantially isothermal manner.

In operation, a liquid feed stream to be separated is preheated to the desired isothermal operating temperature of the system and is introduced into the first stage of a membrane permeation unit divided into a feed zone and a permeate zone. The zones are separated by one or more selected thin, nonporous membranes. A portion of the liquid feed stream to be removed and recovered diffuses through the membrane, and into the permeate zone as a fraction enriched in permeate, while the remaining part of the liquid feed stream, reduced in permeate content, is removed from the feed zone and recovered or sent to another or lower stage of the membrane permeation system, such lower stage being one with feed stream of reduced permeate content. A liquid solvent stream, at essentially the same temperature as the feed stream and membrane unit and at a selected flow rate and pressure, is introduced into the permeate zone, usually but not necessarily countercurrent or cross-current to the flow of the liquid feed stream in the feed zone. The diffused permeate-rich fraction in the permeate zone is dissolved in the liquid solvent sweep stream.

In a multistage system the liquid feed stream may be mixed with a liquid re-cycled stream from one or more stages or other feed streams of similar composition, such as the permeate-lean stream of the next higher stage, and the liquid stream increased in pressure to the operating pressure of the particular stage to which it is being introduced. A liquid effluent stream comprising the liquid solvent sweep stream and the dissolved permeate-enriched fraction is withdrawn from the permeation zone. This stream is then reduced in pressure to essentially the vapor pressure of the permeate-enriched fraction or lower vapor pressure, such as by passing the effluent stream through a pressure reducing valve controlled by a back-pressure regulator. This effluent liquid stream is then introduced into a heat exchanger such as an evaporator where the latent heat of vaporization for the permeate is supplied to vaporize the permeate-enriched fraction. The vaporized permeate-enriched fraction and the still liquid solvent stream, at essentially the isothermal temperature of introduction into the membrane permeation unit, is then introduced into a gas-liquid phase separator such as a cyclone separator. The liquid solvent stream is withdrawn from the phase separator. A portion of the sweep stream may be re-cycled back into the evaporator so that the evaporator may operate with a high percentage of liquid in the stream without diluting the liquid stream effluent in the permeation zone of the membrane unit. All or the remaining portion of the solvent stream from the phase separator is then pumped back or increased in pressure to the membrane unit system pressure and re-introduced as the liquid solvent stream to the permeate zone of the membrane unit. Make-up for any liquid solvent lost in the system is continuously or periodically added to the recycled solvent stream. Sufficient heat to maintain the selected isothermal temperature of the process as desired may be added anywhere in the permeate recovery system.

Vaporized permeate-enriched fraction withdrawn from the phase separator may then be recovered by any suitable means. For example, the fraction is condensed and recovered for use as product or sent to an accumulator vessel in a multistage system, or it may be mixed directly with a mixture effluent from a higher stage of the system. Means are provided to maintain the pressure in the recovery system, i.e. the accumulator, the condenser, the phase separator and the evaporator at substantially the pressure or slightly lower of the permeate-enriched fraction vapor pressure. If the recovery system pressure is less than atmospheric, the pressure may be maintained by the use of a steam ejector connected to the accumulator vessel and where the system is under pressure, the steam ejector may be replaced by a pressure-regulating valve.

Our process is both practical and economical since the system is based upon varying only the pressure in the permeate recovery cycle, rather than varying temperature. The relative cost required for operating and varying the pressure is considerably less than the cost of heating and cooling a solvent liquid stream. Our process may be operated as a single stage or as a part of a multistage permeation system, either continuously or as a batch process. The heating of the feed stream is usually employed only in the first stage to bring the liquid feed stream up to the desired temperature, while heat losses in the system can be compensated for anywhere within the system so as to maintain the entire system at the optimum or selected constant process temperature. In our system the evaporation of the permeate, therefore, takes place due to the difference in pressure in the system and not to any meaningful or deliberate substantial differences in temperature within the system.

The selection of the particular isothermal temperature or temperature range at which the process is to operate depends in part upon the solution temperature of the membrane in the presence of permeating liquid, and the vapor pressure of the permeate-enriched liquid. Of course, the maximum operating temperature is that at which the membrane loses its permeation-selective character at permeation conditions due to dissolution. Below this solution temperature, membrane permeability increases as temperature increases, and consequently membrane surface area requirement decreases. However, the vapor pressure of the permeate-enriched liquid and, therefore, the evaporator, phase separator, condenser, accumulator operating pressure, also increase with temperature. Thus, a reasonable balance in both fixed and operating costs must be maintained between the investment required for a high-pressure system, versus the amount of membrane surface area required. The selected isothermal temperature of the system may be about 100° F. for the separation of high vapor-pressure mixtures, such as of butene-1 from isobutene, or 200–350° F., preferably 250° F., for the separation of meta and para xylenes, or higher, depending upon the liquid mixture and the membrane composition. The isothermal temperature of our process may range from about 40 to 600°, for example 80 to 350° F. The isothermal temperature selected should be below the critical solution temperature of the particular membrane employed in the membrane permeation unit, i.e., the melting point of the membrane in contact with the liquid feed stream. The characteristics of the membrane may, therefore, limit the selection of the best isothermal temperature for the system. In other cases, the isothermal temperature selected may be less than the critical solution temperature of the system due to the high vapor pressures involved at the higher temperatures, so that economic factors dictate the use of a lower isothermal temperature. In addition, the permeation-selectivity of a particular membrane system may vary with the temperature of the system, so that this factor should be considered in selecting a particular isothermal temperature at which to operate.

The liquid solvent or sweep stream used may comprise any liquid stream having certain necessary characteristics. Liquid hydrocarbon streams, due to their ready availability and low cost, are often preferred particularly when a hydrocarbon mixture is to be separated. A liquid solvent stream, therefore, may comprise liquid hydrocarbon streams such as aliphatic, aromatic, unsaturated, saturated streams, as well as various naphtha or petroleum fractions, liquefied petroleum gas and the like. Other liquid solvents which may be employed include but are not limited to glycols and polyglycols such as ethylene and propylene glycols and polyols, halogenated hydrocarbons, such as perchloroethylene, fluorocarbons, low molecular weight polymeric liquids and oils, silicones, water, as well as oxygenated hydrocarbons, such as ketones, esters, alcohols and other liquids usually employed in petroleum or chemical processes as solvents and extraction liquids. The liquid material selected for the liquid solvent stream should not unduly effect or degrade the particular membrane system employed, and its back diffusion through the membrane should be low or negligible. In addition, the permeate-enriched fraction, to be removed or recovered in the permeate zone, must exhibit good or preferably a high solubility in the liquid solvent stream selected. The liquid solvent stream should have a different, such as a lower vapor pressure in comparison to the permeate, i.e. a different or higher boiling point material is preferred for cases of separation of the permeate enriched fraction. Typically the liquid solvent stream should have a boiling point of at least 50° and often about 100° or 200° F. or greater than the permeate-enriched fraction to be recovered from the permeate zone at the pressure at which permeate is recovered from the solvent. The liquid solvent selected should not normally form azeotropes with the permeate-enriched fraction. The permeate-enriched fraction should be recoverable from the solvent by vaporization and preferably by simple, inexpensive flash evaporation or distillation techniques. In a hydrocarbon separation process, a typical liquid solvent stream may comprise a kerosene or middle distillate petroleum fraction having a boiling point range of about 400 to 650° F., for example a middle distillate of about 500 to 600° F. boiling point range.

In the most common useage the liquid solvent or sweep stream should have a lower vapor pressure than the permeate enriched fraction, so that the permeate-enriched fraction may be easily vaporized and recovered. In such an operation the solvent stream is maintained and recycled as a liquid stream, while only the latent heat of vaporization of the permeate-enriched fraction is furnished to the effluent stream in the evaporator. However, the liquid stream used may be more volatile as in those cases where the liquid sweep stream represents a small part of the liquid effluent stream withdrawn from the membrane unit. It may then be desirable to vaporize the sweep liquid. The heat in the evaporator would then be the latent heat of vaporization of the liquid stream and a liquid stream of higher volatility than the permeate-enriched fraction is then chosen. The isothermal conditions of the process are still maintained, but the permeate-enriched fraction is directly recovered as a liquid stream, while a vaporized sweep liquid is withdrawn from the evaporator and may be recovered such as by condensation and recycled for further use in the recovery system. In such cases the effluent stream is then reduced in pressure to the pressure or below of the sweep liquid prior to introduction of the effluent stream into the evaporator. A typical sweep liquid would include a liquefied petroleum gas.

The criterion for the selection of a suitable liquid solvent for our process includes low membrane permeability relative to the permeability of the mixture to be separated, a different volatility relative to the permeate-enriched fraction, and at least moderate solvent power with the permeate-enriched fraction. It is also desirable to use a liquid of reasonably low viscosity to help reduce pumping cost and requirements.

The flow rate of the liquid solvent stream, i.e. the rate of circulation through the permeate zone in the membrane permeation unit, is governed in part by the concentration gradient of the permeating liquids which it is desirable to maintain across the membrane. The downstream concentration of a permeating liquid can rise to a moderately high level before having a significant effect on the permeation rate. However, even if very high liquid solvent flow rates are required in our process the effect on cost of the operating system is low since the major effect would be on pumping costs which are quite small. This latter effect would not be true in any nonisothermal process where the heating and cooling requirements would increase in proportion to the increase in the flow or circulation rate. In general, the weight ratio of the liquid solvent to the permeate in the effluent stream withdrawn from the membrane unit may range from about 0.01 to 100 e.g., 0.1 to 10.0.

The pressure of the liquid solvent sweep stream introduced into the permeate zone of the membrane unit should be above the vapor pressure of the permeate-enriched fraction in the permeate zone and the pressure required to pass the stream through the permeate zone. The pressure of the liquid stream may range from 10 to 1000 p.s.i.a. Typically the pressure may be the same or a substantially similar pressure to the pressure of the feed stream in the feed zone, particularly where unsupported, thin membranes are employed. In operation the pressure of the liquid effluent stream from the permeate zone is reduced prior to or on introduction of the effluent stream into the low pressure recovery system, i.e. from the evaporator to the pump in the recycle conduit diverting the liquid solvent back to the permeate zone. The effluent stream is reduced in pressure to about the pressure or below the pressure of the liquid in the permeate zone which is to be vaporized in the recovery system. For example, the pressure drop may be up to about 200 p.s.i. or more e.g. 5–100 p.s.i. for a hydrocarbon permeation system. In one preferred operation the pressure of the effluent stream is reduced just prior to introduction of the stream into a single-stage evaporator to the pressure or just below the pressure of the permeate-enriched fraction in the permeate zone. Flash evaporation of the permeate-enriched fraction then occurs in the evaporator. Large pressure reduction should be avoided to prevent temperature changes in the isothermal process.

The membrane in the membrane unit may be prepared from any organic or inorganic materials which exhibit selective permeation properties toward the components of the mixture to be separated. A wide variety of materials are known which exhibit such characteristics. These materials often comprise common, natural or synthetic polymeric material which is often used in a thickness of from about 0.1 to 10 or more mils in thickness, e.g., 1 to 5 mils and may be unsupported or supported. The membrane material may be used in any sheet, film, tube, hollow fiber or other form which provides a membrane unit having a feed zone and a permeate zone. The membrane material can be used as produced, alone or in combination with other membrane materials, or treated by radiation, solvents, chemicals, orientation or other techniques to enhance the selectivity for the particular separation and/or the permeation flux. Typical treating methods would include irradiation, chemically reacting the polymer to change its chemical composition and nature, subjecting it to a solvent swelling and/or thermal cycle, orienting it in a particular fashion or direction by thermal or mechanical stress treatment or by radiation or other means.

Typical membrane materials which may be used include but are not limited to: $C_2$–$C_4$ polyolefins such as polyethylene and polypropylene; polyamides such as nylon; polyesters such as Mylar; fluoro polymers such as Teflon; acrylic resins; styrene resins such as polystyrene; rubbers such as neoprene, chloroprene, butyl rubber, polybutadiene, copolymers of butadiene with styrene, butadiene-nitrile copolymers and other natural and synthetic elastomers, and cellulose derivatives such as cellulose ethers and esters such as hydroxyl cellulose, ethyl cellulose, cellulose acetate and cellulose acetate butarate, vinyl chloride resins, such as Saran, polyvinyl chloride, vinyl chloride-vinyl acetate copolymers, vinyl acetate resins like polyvinyl acetate, silicone rubbers, urethanes, ion exchange resins, glass, ceramics, metal foils and the like.

The liquid feed material may be any feed mixtures, aqueous or non-aqueous, separable by semi-permeable membrane techniques. The feed mixtures may be continuously or intermittently introduced into the feed zone. The liquid mixtures may include various petroleum fractions, naphthas, oils, hydrocarbon mixtures, as well as other liquid mixtures including chemical reaction mixtures, mixtures of branched and straight-chain compounds, mixtures of structural, positional and other isomers, azeotropic mixtures, and the like. For example, our process may be used for the improvement in octane number of gasoline blending stocks by the selective removal of low octane components from naphthas. Our process is also applicable to the removal of aromatics from kerosene to enhance the smoke point or extraction of normal hydrocarbons to lower the freezing point of various petroleum fractions. For example, jet fuel yield may be increased by bringing within the specifications gasoline derived from paraffinic crudes by increasing jet fuel end points, while maintaining the necessary product quality. Our process may also be used for separating or removing reaction products from a reaction mixture in order to enhance the selectivity of the reaction or to shift the chemical equilibrium of the reaction.

For the purposes of illustration only our process will be described with regard to the separation of a mixture of meta and para xylenes. In a typical petrochemical process, the product from naphtha reformer is introduced into a solvent extraction or aromatic recovery unit and a $C_8$ aromatic fraction removed which comprises a mixture of ortho, meta and para xylenes and ethylbenzene. This mixture is then distilled to remove ethylbenzene and ortho xylene. The meta-para xylene mixture stream is then introduced into a crystallization unit wherein high-purity para xylene is recovered, and a mixture of meta and para xylene rejected from the unit. This rejected mixture is directed to an isomerization unit wherein an equilibrium mixture of $C_8$ aromatics is formed and recycled back to the distillation and crystallization units. Our isothermal liquid-liquid membrane permeation system may be employed in such a petroleum process in place of or to supplement the crystallization unit.

FIG. 1 is a schematic illustration of a multistage permeation membrane system. Three stages, stage N, $(N+1)$ and $(N+2)$ are illustrated here, although more or fewer stages may be employed in any membrane system. In stage N, a feed stream is introduced through conduit 16 into a feed zone 12 of a stage N membrane unit 10 with a portion of the feed stream diffusing as a permeate-enriched fraction into the permeate zone 14 of the membrane unit. The permeate-lean fraction stream is withdrawn from the feed zone 12 through conduit 20, while the permeate-enriched stream is withdrawn from the permeate zone 14 through conduit 18. The permeate-enriched stream may be introduced as all or a portion of the feed stream into the feed zone of the next higher stage $(N+1)$, which is membrane unit 20, while the permeate-lean stream withdrawn from the feed zone 12 from stage N may be introduced as a part of the feed stream into the next lower stage $(N-1)$ (not shown). The permeate-rich stream withdrawn from stage $(N+1)$ may be introduced as the feed stream into the next higher membrane unit 22, stage $(N+2)$.

FIG. 2 is a schematic illustration of a complete isothermal liquid-liquid stage N membrane permeation unit which has been diagrammatically illustrated in a multistage system in FIG. 1. In one embodiment of our process a liquid feed stream mixture such as a meta and para xylene mixture, withdrawn from a distillation unit, is pumped through conduit 30 to a preheater 32, wherein the stream is heated to the isothermal temperature selected for the particular membrane system which for this meta and para xylene separation is approximately 250° F. The heated liquid stream is withdrawn through conduit 34 and introduced through conduit 16 into the feed zone 12 of the stage N membrane unit 10. This feed stream 12 may be mixed with a meta and para xylene stream of similar composition, i.e. the permeate-lean stream from stage $(N+1)$ pumped up to the desired pressure by pump 38 and introduced via conduit 36 and conduit 16 into the feed zone 12. The permeate-lean stream from stage $(N+2)$ may be mixed with the permeate-enriched stream from stage N, and the combined streams fed to stage $(N+1)$. Optimum operation is obtained when stage sizes are varied so that only streams of equal or nearly equal composition are mixed. The stage N permeation membrane unit 10 is illustrated as divided into a permeate zone 14 and a feed zone 12 separated by a semipermeable, thin, nonporous membrane 40, which for the separation of the meta-para xylene mixture may comprise a 1 mil polypropylene membrane film. The membrane 40 allows selective permeation of para xylene as the liquid feed stream passes from the inlet to the outlet end of the membrane unit 10. The para xylene diffuses through the membrane 40 and into the permeate zone 14, while a permeate-lean, i.e. meta xylene enriched stream is withdrawn from the membrane unit 10 through conduit 20. The stage N permeate-lean fraction may be introduced as a feed stream into a next lower membrane stage $(N-1)$ or directed back to a crystallization unit.

A liquid sweep stream is introduced through conduit 42 into the membrane unit 10 to pass preferably cross, or as shown, countercurrent in the permeate zone 14 to the feed stream flow in feed zone 12. The sweep stream is introduced at a pressure about the same as the feed stream pressure. The para xylene permeate fraction dissolves in the liquid solvent stream and the liquid effluent stream with the permeate-enriched fraction is withdrawn from the membrane unit 10 through conduit 18 which contains a pressure valve 44 with a back pressure regulator. This valve reduces the pressure of the effluent stream to the pressure of the permeate fraction in the permeate zone or slightly below its pressure. The effluent liquid stream at the reduced pressure is introduced into the permeate recovery system and into a single-stage evaporator 48. The liquid sweep stream comprises a liquid petroleum fraction having a boiling point range of about 500 to 625° F. The meta-para xylene permeate-enriched fraction is soluble in the solvent stream. The flow rate of the liquid solvent stream into the permeate zone is controlled so that the composition of the effluent stream drawn from the permeate zone 14 as approximately 50 weight percent solvent and 50 weight percent of the permeate-enriched fraction. Valve 44 controlled by the pressure regulator lets down the pressure of the liquid solvent effluent stream from a pressure of about 43 p.s.i.a. to the vapor pressure of the permeate-enriched fraction, i.e., about 9 p.s.i.a. in the effluent stream prior to introducing the liquid stream into the single stage evaporator 48.

In the evaporator 48 only the latent heat sufficient to vaporize the permeate-enriched fraction is supplied. The vaporized permeate-enriched fraction and the liquid solvent stream is then removed through conduit 50 and introduced into a phase separator 52 such as a gas-liquid cyclone separator. The vaporized permeate-enriched fraction at the isothermal temperature of the system, i.e. about 250° F., is withdrawn through conduit 64 and introduced into a condenser 66 with cold water coils or forced air cooling where the permeate-enriched fraction is condensed. The condensed permeate-enriched fraction is then withdrawn from the condenser 66 through conduit 68 and introduced into an accumulator or storage vessel 70. A permeate-lean stream from a higher stage, such as stage $N+2$ and containing the same or a very similar composition as the condensed permeate-enriched fraction of stage N, may also be introduced via conduit 72 into the accumulator vessel 70. These condensed fractions may be withdrawn from the accumulator through conduit 78 and introduced under pressure by pump 80 as all or part of the feed stream to the next higher stage $N+1$ or withdrawn as a product stream. Where the permeate-enriched fraction has a low vapor pressure such as in the present case with xylenes, a means is employed to maintain the pressure in the recovery system to essentially that of the permeate-enriched fraction vapor pressure. In the separation of xylenes a system pressure regulation 74 such as a steam ejector communicating through conduit 76 to the top of accumulator 70 is employed to maintain the vapor pressure in the accumulator 70, the condenser 66, the phase separator 52 and the evaporator 48 at about the vapor pressure of the permeate-enriched fraction, i.e. 9 p.s.i.a. Where the permeate-enriched fraction creates a positive gauge pressure in the accumulator 70, the ejector may be replaced by a pressure regulating valve.

The liquid solvent stream withdrawn from the bottom of the phase separator 52 through conduit 54, and still at the isothermal temperature, is pumped up to the desired operating pressure by pump 58 and then reintroduced through the recycle conduit 42 back into the permeate zone 14. A portion of the liquid solvent stream, for example 100 to 1000 percent based on the liquid solvent feed to stage N, may be recycled and introduced into the evaporator 48 through conduit 56 to permit the evaporator to operate with a high percentage of liquid solvent in the effluent stream without diluting the solvent-permeate effluent stream in the permeate zone 14. A source of sweep liquid 60 is provided so that any additional make up liquid required to compensate for liquid losses in the system, for example by entrainment of the liquid-solvent with the vaporized permeate-enriched fraction going to the condenser and other losses, may be introduced through conduit 62 into the recycle conduit 54. In addition, any heat losses occurring within the system can be compensated for at any suitable point in the system in order to maintain the isothermal temperature conditions as initially selected. A liquid level control is employed in conduit 54, which control operates with a control valve in conduit 62, so that the level of liquid in the permeate recovery cycle is maintained constant by make up solvent from source 60.

Our membrane permeation system for the recovery of para and meta xylene mixtures is based on varying the pressure in the permeate recovery cycle rather than the temperature. As is apparent, the cost of energy for operating, for example, a steam ejector is considerably less than the cost of continually heating and cooling a liquid stream.

In another embodiment of our invention a feed stream comprising a feed mixture containing a $C_4$ isomeric fraction of butene-1 and isobutene may be separated in our isothermal membrane permeation system as described employing a temperature of about 100° F. The isothermal temperature of the xylene process was selected based on the upper limit of the critical solution temperature of the polypropylene membrane. In the case of the butylene mixture, a lower temperature is selected in order to keep the cost of equipment at a low level due to the higher vapor pressures of the feed stream. In such a system a similar liquid solvent stream and membrane may be employed as was employed in the xylene operation.

Typical operating conditions for the separation of xylene and butene mixtures by our process in stage N are shown in the following table:

TABLE

|  | System | |
|---|---|---|
|  | Butylene | Xylene |
| Temperature (° F.): | | |
| a. At membrane | 100 | 250 |
| b. Permeate Recovery System | 100 | 250 |
| Pressure (p.s.i.a.): | | |
| a. At membrane | 88 | 43 |
| b. Permeate Recovery System | 66 | 9 |
| Feed to Stage N (lbs./hr.): | | |
| a. Fresh feed | 19,690 | 18,100 |
| b. Feed from stage N+1 | 17,810 | 25,220 |
| c. Total feed | 37,500 | 43,320 |
| Feed Composition (wt. percent): | | |
| a. Butene-1 | 49.6 | |
| b. Isobutene | 50.4 | |
| c. Para xylene | | 26.1 |
| d. Meta xylene | | 73.9 |
| Sweep Liquid (lbs./hr.) | 25,570 | 28,000 |
| Permeate-Lean Fraction from Feed Zone (lbs./hr.) | 11,930 | 15,320 |
| Permeate-Lean Fraction Composition from Feed Zone (wt. percent): | | |
| a. Butene-1 | 17.9 | |
| b. Isobutene | 82.1 | |
| c. Para xylene | | 12.9 |
| d. Meta xylene | | 87.1 |
| Permeate-Enriched Fraction from Permeate Zone (lbs./hr.) | 25,570 | 28,000 |
| Permeate-Enriched Fraction Composition (Sweep Liquid Free Basis) (wt. percent): | | |
| a. Butene-1 | 64.4 | |
| b. Isobutene | 35.6 | |
| c. Para xylene | | 33.4 |
| d. Meta xylene | | 66.6 |

FIG. 3 is a schematic representation of a particular multi-stage column-type membrane permeation system. In such a system a column 102 contains a plurality of discs acting as a membrane 100, the disc being separated by alternating solid barriers 104. Each disc is composed of very small diameter hollow fibers of membrane material which give a desirable high surface to volume ratio. In most other cases, the use of such fibers creates pressure drops which may be prohibitively high. However, such high pressure drops are alleviated in part by forming a very squat bundle of low length to diameter ratio, i.e. in the form of a disc or a plate. Such disc or plate to be used, as shown in FIG. 3, is produced by bundling long, small-diameter, hollow fibers together, joining them at closely spaced intervals with a potting resin or compound, e.g. a liquid which hardens to a solid, and then cutting through the fiber bundle at each point of juncture. Each disc will then contain a plurality of short fibers connected at common headers. A multistage system similar to that in FIG. 3 is formed by mounting these discs in a column with the fibers essentially vertical. The permeate recovery system associated with each or any stage has not been shown in FIG. 3. As illustrated, the permeated fluid from the shell side, i.e. the exterior side of the fibers, of stage N is directed to the upstream header 105 at the tube side, i.e. the interior side of the fibers, of stage $N+1$ via conduit 106. A nonpermeate or permeate-lean mixture at the downstream header 107 of stage N is recycled to the upstream header 108 of stage $N-1$ via conduit 109. Similarly, permeate from stage $N+1$ is fed to the next higher stage (not shown), and the unpermeated portion is recycled to the upstream header of stage N. An "ideal cascade" in which both streams are of equal or nearly equal composition is produced by progressively decreasing the thickness of each hollow fiber disc 100 in a calculable fashion as either end of the column is approached.

Of course, any membrane configuration or membrane permeation system may be used in our process, but a preferred geometry of a membrane would be that of hollow tubes arranged with common headers in a typical shell-and-tube type exchanger or vessel. For a larger diameter tube, say ⅛ inch to 1 inch or more, a simple, straight bundle with or without baffles can be employed. Where smaller diameter tubes are used, say in the range of $\frac{1}{5,000}$ of an inch to ⅛ of an inch, it is often necessary to use a special arrangement in order to insure a uniform distribution of flow on the shell side of the fiber bundle. As in our process the multistage column system may be maintained under isothermal conditions by surrounding the column and conduits with an appropriate insulation, controlling the temperature of the feed streams and making up any heat losses occurring during the separation process.

Our process has been described for purposes of illustration only employing xylene and butene type hydrocarbon isometric mixtures. However, our process is applicable to any liquid mixtures, both aqueous and nonaqueous, capable of being separated by a membrane permeation system. The use of an isothermal system whereby the temperature of the permeation unit and the permeate recovery system is maintained constant with variations only in the pressure of the system provides a system of low operating cost. In addition, the use of a liquid solvent stream in such an isothermal system, with a single-stage evaporation unit with recycle of the liquid sweep stream, avoids many of the difficulties associated with the prior art. Our process may be operated as a single stage membrane process or incorporated into other known petroleum or chemical process operations, or preferably operated as a multistage membrane permeation process.

What we claim is:

1. A membrane permeation method for the separation of liquid mixtures which method comprises:
   introducing a liquid feed mixture to be separated into a permeate-enriched and a permeate-lean liquid fraction into a feed zone, the feed zone being part of a membrane permeation system characterized by a permeate zone and a feed zone, the zones separated by a thin membrane material exhibiting a selective permeation affinity for at least one component of the feed mixture;
   permeating a fraction of the liquid feed mixture through the membrane from the feed zone into the permeate zone to obtain in the permeate zone a permeate-enriched fraction;
   contacting the permeate-enriched fraction in the permeate zone with a liquid sweep stream, which liquid sweep stream is a solvent for the permeate-enriched fraction, and has a different volatility than the permeate-enriched fraction and from which the resulting liquid effluent stream the said fraction and liquid may be separated by evaporation;
   withdrawing from the permeate zone a liquid effluent stream comprising as components thereof the permeate-enriched fraction and the liquid sweep stream;
   withdrawing from the feed zone a permeate-lean fraction;
   reducing the pressure of the liquid effluent stream to a pressure of about the pressure or lower in the permeate zone of the component of the liquid effluent stream to be vaporized;
   vaporizing one component of the liquid effluent stream by addition of only the latent heat of vaporization for that component;
   separating the vaporized component and the liquid component of the effluent stream;
   recovering the permeate-enriched fraction; and
   recycling at least a part of the liquid sweep stream to the permeate zone, all steps of the process being carried out under a selected single substantial isothermal condition without intentional steps to change the temperature of the liquid sweep, feed, or liquid effluent streams.

2. The method of claim 1 which includes:
   employing a liquid sweep stream having a lower volatility than the permeate-enriched fraction in the permeate zone;
   reducing the pressure of the liquid effluent stream to about the pressure or less of the permeate-enriched fraction in the permeate zone;
   vaporizing substantially only the permeate-enriched fraction by supplying the latent heat of vaporization to the reduced pressure liquid effluent stream;
   condensing the vaporized permeate-enriched fraction; and
   withdrawing the condensed permeate-enriched fraction as a product stream.

3. The method of claim 2 which includes:
   maintaining the pressure in the vaporizing, separating, condensing and withdrawing of the condensed permeate-enriched fraction steps of the permeate recovery at about the pressure of the permeate-enriched fraction in the permeate zone.

4. The method of claim 1 wherein the liquid solvent sweep stream is characterized by a boiling point of greater than 50° F. or above the boiling point of the permeate-enriched fraction in the permeate zone.

5. The method of claim 1 wherein the feed stream includes a permeate-lean fraction stream withdrawn from another stage of a multi-stage permeation membrane process.

6. The method of claim 1 wherein the liquid feed stream comprises a mixture of hydrocarbon stream.

7. The method of claim 1 wherein the membrane includes a plurality of small diameter hollow fibers fabricated into bundles of low length-to-diameter ratio, as membranes between a permeate and feed zone.

8. The method of claim 1 wherein the process represents one stage in a multi-stage membrane permeation system and which includes introducing the permeate-lean fraction withdrawn from the feed zone into the feed zone of a stage lower in content of the more permeable component and introducing the condensed permeate-enriched fraction into the feed zone of a stage higher in content of the more permeable component.

9. The method of claim 1 which includes:
   introducing the liquid sweep stream into the permeate zone at a pressure of about the pressure of the liquid feed mixture in the feed zone.

10. The method of claim 1 which includes:
    employing a liquid sweep stream having a higher volatility than the permeate-enriched fraction in the permeate zone;
    reducing the pressure of the liquid effluent stream to about the pressure of the liquid sweep stream or lower;
    vaporizing the liquid sweep stream;
    recovering the liquid permeate-enriched fraction; and
    condensing the liquid sweep stream.

11. The method of claim 1 which includes:
    withdrawing a liquid solvent stream and a vaporized permeate-enriched fraction stream from a single stage evaporator wherein the latent heat of vaporization of the permeate-enriched fraction is supplied;
    introducing the stream into a gas-liquid phase separator;
    withdrawing from the phase separator a vaporized permeate-enriched fraction;
    condensing the vaporized permeate-enriched fraction, and withdrawing the liquid solvent stream from the phase separator;
    introducing a portion of the liquid stream to the evaporator; and
    recycling a portion of the liquid solvent stream into the permeate zone.

12. The method of claim 11 which includes:
    reducing the pressure of the liquid effluent stream to below the pressure of the permeate-enriched fraction in the permeate zone whereby flashing of the permeate-enriched fraction occurs upon introduction of the liquid stream into the evaporator.

13. The method of claim 11 which includes:
    introducing the liquid sweep stream at a pressure of between 10 and 1000 p.s.i.a. into the permeate zone in a different flow direction than the flow direction of the feed stream, the weight ratio of liquid sweep stream to the permeate-enriched fraction ranging from 0.1 to 10.

14. The method of claim 11 which includes:
maintaining the temperature of the process at a constant temperature between about 80 and 350° F., the feed mixture comprising a mixture of meta and para xylenes, to be separated.

15. The method of claim 10 which includes:
maintaining the temperature of the process at a constant temperature of between about 40 and 200° F., the feed mixture comprising a mixture of $C_4$ hydrocarbon isomers, to be separated.

References Cited

UNITED STATES PATENTS 3,244,763  4/1966  Cahn _____ 260—677

DELBERT E. GANTZ, *Primary Examiner.*

C. E. SPRESSER, *Assistant Examiner.*